United States Patent [19]

Chen

[11] 4,066,739
[45] Jan. 3, 1978

[54] PROCESS FOR RECOVERING HYDROGEN AND ELEMENTAL SULFUR FROM HYDROGEN SULFIDE AND/OR MERCAPTANS-CONTAINING GASES

[76] Inventor: Wu-Chi Chen, 859 Brittmoore Road, Houston, Tex. 77079

[21] Appl. No.: 672,004

[22] Filed: Mar. 30, 1976

[51] Int. Cl.² ............... C01B 17/02; C01B 1/03; C01B 7/18; C01B 7/14
[52] U.S. Cl. ................... 423/571; 423/481; 423/500; 423/507; 423/648 R
[58] Field of Search ............... 423/648, 500, 571, 481, 423/507

[56] References Cited

U.S. PATENT DOCUMENTS

| 1,034,646 | 8/1912 | Rabenalt | 423/573 X |
|---|---|---|---|
| 2,086,825 | 7/1937 | Simpson | 423/500 X |
| 2,143,222 | 1/1939 | Heath | 423/481 X |
| 3,044,862 | 7/1962 | Paul | 423/500 X |
| 3,080,217 | 3/1963 | Myers | 423/500 |
| 3,365,276 | 1/1968 | Childs et al. | 423/507 X |
| 3,839,550 | 10/1974 | Wentorf, Jr. | 423/648 X |

*Primary Examiner* — Edward Stern

[57] ABSTRACT

A process for removing hydrogen sulfide and/or mercaptans from hydrogen sulfide and/or mercaptans-containing gases using aqueous iodine slurry and/or solution to recover elemental sulfur as one product and to generate hydriodic acid which is dehydrated, pressurized, and decomposed into iodine for recycling and into hydrogen for recovering as another product.

2 Claims, 1 Drawing Figure

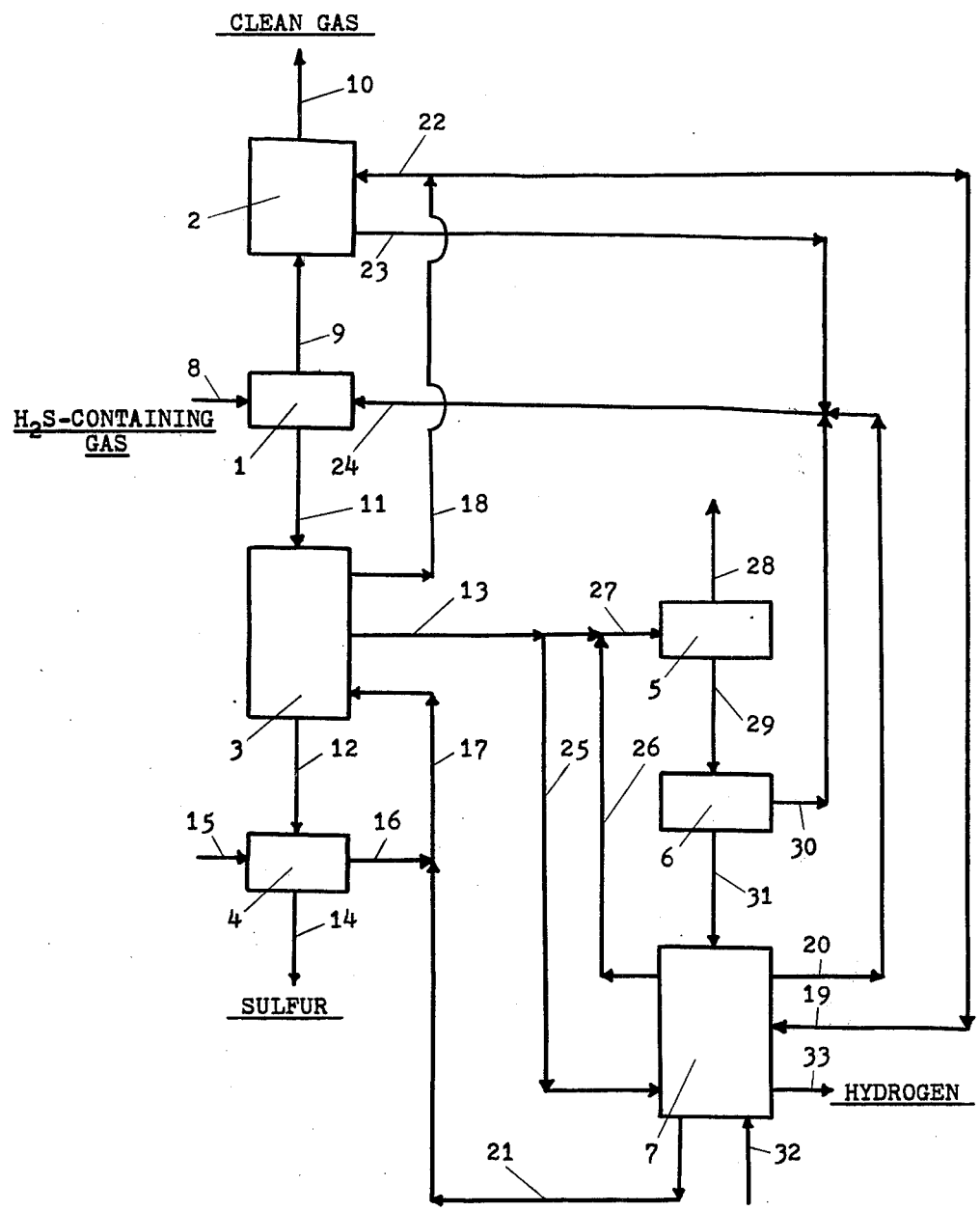

PROCESS FOR RECOVERING HYDROGEN AND ELEMENTAL SULFUR FROM HYDROGEN SULFIDE AND/OR MERCAPTANS-CONTAINING GASES

FIELD OF THE INVENTION

This invention relates to new and improved methods for removing hydrogen sulfide and/or mercaptans from hydrogen sulfide and/or mercaptans-containing gases and recovering hydrogen and elemental sulfur from the removed hydrogen sulfide and/or mercaptans. More specifically, this invention relates to the methods of use of aqueous iodine slurry and/or solution, hydriodic acid, and hydrogen iodide as intermediate chemicals for hydrogen sulfide and/or mercaptans removal, and for hydrogen and sulfur recovery.

BACKGROUND OF THE PRIOR ART

Hydrogen sulfide and/or mercaptans are conventionally removed from hydrogen sulfide and/or mercaptans-containing gases using absorption-desorption processes. The resulting concentrated hydrogen sulfide gaseous stream is then fed into Claus Process to recover elemental sulfur and to recover the fuel value contained in hydrogen sulfide. The tail gas from Claus Process contains trace amount of sulfur compounds which are then removed, for example, using absorption-oxidation processes to ensure the quality of the exhausted gas. The importance of recovering hydrogen and elemental sulfur from hydrogen sulfide has been well recognized in the United States and abroad for some time. U.S. Pat. No. 2,979,384 disclosed a process for hydrogen recovery from hydrogen sulfide using iron, nickel, and/or cobalt sulfides as intermediate chemicals. U.S. Pat. No. 2,984,548 disclosed a process for hydrogen recovery from hydrogen sulfide by passing hydrogen sulfide through a hot tungsten filament.

Reaction of hydrogen sulfide with iodine is a well-known phenomenon. U.S. Pat. Nos. 3,607,004 and 3,716,620 disclosed processes for removing trace amount of hydrogen sulfide and/or mercaptans from gases using iodine in organic solvents. With organic solvents, the advantage of preventing iodine carry-over by the inert gases and the advantage of easy sulfur recovery in crystal form were disclosed in U.S. Pat. No. 3,607,004. As described in details in this invention, I have found that using aqueous systems this invention provides a new and improved process for removing hydrogen sulfide and/or mercaptans from hydrogen sulfide and/or mercaptans-containing gases with proper recovery of elemental sulfur from the resulting aqueous sulfur slurry, and without iodine carry-over by the inert gases. Thermal decomposition of hydrogen iodide is another well-known phenomenon. U.S. Pat. No. 3,365,276 disclosed a process for hydrogen recovery from hydrogen halides where the hydrogen formed by decomposition diffused through a thin silver-palladium alloy tube. British Pat. No. 796,049 disclosed a process for iodine recovery for dehydrogenation of organic materials by passing hydrogen iodide-containing gases through a carbon bed. As described in details in this invention, it provides a new and improved process for hydrogen and elemental sulfur recovery from hydrogen sulfide and/or mercaptans-obtaining gases.

SUMMARY OF THE INVENTION

According to this invention, there is provided a process for recovering hydrogen and elemental sulfur from hydrogen sulfide and/or mercaptans-containing gases using aqueous iodine slurry and/or solution to recover elemental sulfur as one product and to generate hydriodic acid which is dehydrated, pressurized, and decomposed to recover iodine for recycling and to recover hydrogen as another product.

In one aspect of this invention, hydrogen sulfide and/or mercaptans-containing gases are contacted with aqueous iodine slurry and/or solution to obtain sulfide-free gases and to obtain mixtures of elemental sulfur and concentrated hydriodic acid. Elemental sulfur is recovered from sulfur and hydriodic acid mixtures using centrifugal filter with extensive water wash. The resulting concentrated hydriodic acid is passed through a ultrafiltration device or sand beds to remove fine sulfur and is then flashed to remove any dissolved hydrogen sulfide for recycling.

In another aspect of this invention, concentrated hydriodic acid is dehydrated to obtain anhydrous hydrogen iodide which is then pressurized and decomposed into hydrogen and iodine using high surface catalysts-containing bed or beds. The resulting hydrogen, iodine, and hydrogen iodide mixture is cooled to recover iodine and hydrogen iodide for recycling, and is then washed with hydriodic acid and/or fresh water to obtain substantially pure hydrogen gas.

By following this invention, conventional methods of absorption-desorption processes for hydrogen sulfide and/or mercaptans removal, and Claus Process and its tail gas treatment processes for sulfur recovery are all eliminated without eliminating their functions. The use of iodine slurry and/or solution is a convenient method for removing hydrogen sulfide and/or mercaptans from hydrogen sulfide and/or mercaptans-containing gases. The resulting elemental sulfur and hydriodic acid mixture is then processed to recover iodine for recycling, and to recover elemental sulfur and valuable hydrogen as products.

Accordingly, it is an object of this invention to provide a new and improved method for removing hydrogen sulfide and/or mercaptans from hydrogen sulfide and/or mercaptans-containing gases. It is another object to provide a new and improved method for recovering hydrogen and elemental sulfur from hydrogen sulfide and/or mercaptans-containing gases. It is another object to provide a new and improved method for recovering hydrogen from hydriodic acid.

Other aspects, advantages and objects of this invention will be apparent to those skilled in the art from this disclosure and the appended claims.

DETAIL DESCRIPTION OF THE INVENTION

The drawing shows diagrammatically one process within this invention.

More specifically, the drawing shows a feed of hydrogen sulfide and/or mercaptans-containing gas passing into reaction zone 1 by way of pipe 8. Recycled iodine slurry and/or solution passes into zone 1 by way of pipe 24. Zone 1 serves three functions, namely, removal of hydrogen sulfide and/or mercaptans from hydrogen sulfide and/or mercaptans-containing gas: converting sulfur value in hydrogen sulfide and/or mercaptans into elemental sulfur; and converting hydrogen value in hydrogen sulfide and/or mercaptans into hydriodic acid. Any type of reactor or reactors can be used for zone 1, although a preferred reactor or preferred reactors would employ a stirrer or stirrers to provide better contacts between iodine, and hydrogen sulfide and/or mercaptans. Zone 1 can be operated in a single stage or multistage system.

Zone 1 is operated at temperature between about −20° C. and +80° C. and pressure between about 10 psia. and 5000 psia. to obtain a mixture of elemental sulfur and concentrated hydriodic acid in which concentrated hydriodic acid contains more than 40% by weight of hydrogen iodide and less than 60% by weight of water, and to obtain hydrogen sulfide-lean gas.

The resulting gaseous stream from zone 1 is substantially free of hydrogen sulfide and/or mercaptans. This gaseous stream is removed from zone 1 and fed into operation zone 2 by way of pipe 9. It is then washed with dilute hydriodic acid. Dilute hydriodic acid is fed into zone 2 by way of pipe 22 and is removed from zone 2 by way of pipe 23. If it is desired to reduce hydriodic acid entrainment in the resulting gaseous stream, this said gaseous stream is subsequently washed with fresh water to obtain clean gas which is substantially free of sulfide and iodide. This clean gas is removed from zone 2 by way of pipe 10. Any type of vessel can be used in zone 2, although a preferred vessel would employ perforated trays with sprays to provide good contacts between gaseous streams and wash solutions. Zones 1 and 2 can be operated in a single vessel or separate vessels.

The resulting liquid-solid mixture from zone 1 contains sulfur particles and hydriodic acid. This sulfur slurry is removed from zone 1 and fed into sulfur recovery zone 3 by way of pipe 11. In zone 3, any type of liquid-solid separation devices can be used, although preferred devices would employ a combination of hydroclone, centrifugal filter with water wash, and ultrafiltration device or sand beds. Wash solution is fed into zone 3 by way of pipe 17 and is removed from zone 3 by way of pipe 18. The filtrate which contains concentrated hydriodic acid is removed from zone 3 by way of pipe 13. The sulfur cake is removed from zone 3 and fed into iodine value recovery zone 4 by way of pipe 12.

If it is desired to reduce the iodine value contained in the sulfur cake, this sulfur cake is washed with additional wash water in zone 4. This additional wash water is fed into zone 4 by way of pipe 15. After filtration, elemental sulfur recovered is then dried or melted as one product. Wash solution and iodine value-containing gas and/or solution are then removed from zone 4 by way of pipe 16, and are used as wash water for zone 3.

The concentrated hydriodic acid contained in pipe 13 is fed into dehydration zone 5 to remove water and to obtain anhydrous hydrogen iodide. Alternately, part or whole stream contained in pipe 13 can be used to remove hydrogen iodide from hydrogen iodide-containing gas in hydrogen purification zone 7 by feeding the said liquid stream into zone 7 by way of pipe 25 and removing the resulting liquid stream from zone 7 by way of pipe 26. Concentrated hydriodic acid contained in zone 26 is then fed into zone 5 by way of pipe 27 to obtain anhydrous hydrogen iodide. Water and trace amount of iodine contained in pipe 27 are removed from zone 5 by way of pipe 28. Iodine contained in pipe 28 is recycled to zone 1. Conventional methods for obtaining anhydrous hydrogen iodide from hydriodic acid using hygroscopic iodide salts can be used in zone 5.

Anhydrous hydrogen iodide obtained in zone 5 is removed from zone 5 and fed into hydrogen iodide decomposition zone 6 by way of pipe 29. In zone 6, anhydrous hydrogen iodide is pressurized to between about 200 psia. and 5000 psia. Trace amount of water vapor contained in pipe 29 can be removed from hydrogen iodide gas stream as condensate during these pressurization operations. The resulting pressurized hydrogen iodide stream is then heated to between about 150° C. and 600° C., and passed through a catalytic bed or catalytic beds containing high surface catalysts to decompose hydrogen iodide into hydrogen and iodine. Any type of high surface catalytic bed or beds can be used for hydrogen iodide decomposition. Iodine can be recovered as liquid from the catalytic beds with or without providing cold portions within the catalytic beds to condense gaseous iodine into liquid iodine. Alternately, iodine can be recovered as liquid by cooling the resulting gaseous products to just above the dew point of hydrogen iodide contained in the gaseous stream. The resulting iodine-lean gas is then fed into another hydrogen iodide decomposition bed to manufacture more hydrogen. Or it is cooled to below 150° C., preferably below 40° C., to condense and separate liquid hydrogen iodide and trace amount of iodine for recycling and to obtain hydrogen-rich gas. Iodine recovered is removed from zone 6 by way of pipe 30. This iodine, with or without make-up iodine, is later mixed with recycled wash water and/or dilute hydriodic acid solution, and fed into zone 1 by way of pipe 24.

The resulting hydrogen iodide and iodine-lean gas is removed from zone 6 and fed into hydrogen purification zone 7 by way of pipe 31 to remove trace amount of hydrogen iodide and iodine, and to obtain substantially pure hydrogen. In zone 7, the hydrogen iodide and iodine-lean gas is washed with hydriodic acid and/or water. Concentrated hydriodic acid is fed into zone 7 by way of pipe 25 and removed from zone 7 by way of pipe 26. Dilute hydriodic acid is fed into zone 7 by way of pipe 19 and removed from zone 7 by way of pipe 20. Wash water is fed into zone 7 by way of pipe 31 and removed from zone 7 by way of pipe 21. The resulting gaseous stream contains substantially pure hydrogen and is removed from zone 7 by way of pipe 33 as another product. Any type of vessel or vessels can be used in zone 7, although a preferred vessel or preferred vessels would employ perforated trays with sprays to provide better contacts between gaseous streams and wash solutions.

EXAMPLE

Referring to the drawing, 10,000 pound-moles of gas at about 1,000 psia. of total pressure containing about 100 pound-moles of hydrogen sulfide and trace amount of mercaptans from, for example, a hydrodesulfurization reactor is fed into zone 1 by way of pipe 8. About 45,955 pounds of iodine slurry containing about 25,400 pounds of iodine, 20,100 pounds of water, and 455 pounds of hydrogen iodide is fed into zone 1 by way of pipe 24. The resulting gaseous stream containing about 9,900 pound-moles of inert gas and trace amount of iodine value is removed from zone 1 and fed into zone 2 by way of pipe 9. The resulting liquid and solid mixture containing about 26,055 pounds of hydrogen iodide, 20,100 pounds of water, 3,200 pounds of elemental sulfur, and trace amount of iodine and/or dissolved hydrogen sulfide is removed from zone 1 by way of pipe 11. In zone 1, reaction vessel is operated at about the same pressure as that of the incoming gaseous stream from pipe 8, and at temperature below 80° C., preferably between about −20° C. and +50° C.

About 14,323 pounds of dilute hydriodic acid solution containing 14,070 pounds of water and 253 pounds of hydrogen iodide is fed into zone 2 by way of pipe 22 to wash the incoming gaseous stream and to remove trace amount of iodine value contained in the incoming gaseous stream. The resulting solution is removed from zone 2 by way of pipe 23. The resulting gaseous stream containing negligible amount of iodine and sulfur compounds is removed from zone 2 by way of pipe 10. If it is desired to reduce any hydriodic acid entrainment, this said gaseous stream is again washed with fresh water before it is removed from zone 2 by way of pipe 10. The resulting gas obtained in zone 2 is substantially free of sulfur and iodine compounds.

Sulfur slurry in pipe 11 under pressure of about 1,000 psia. containing about 6.48% by weight of sulfur is fed into zone 3. After passing this sulfur slurry through a power recovery turbine, sulfur is then recovered using a combination of hydroclone, centrifugal filter with water wash, and ultrafiltration device. The resulting filtrate containing about 25,693 pounds of hydrogen iodide and 19,822 pounds of water is flashed at about 100° C. to remove any dissolved hydrogen sulfide which is recycled to zone 1. The resulting concentrated hydriodic acid is removed from zone 3 by way of pipe 13. About 20,462 pounds of wash water containing trace amount of iodine value is fed into zone 3 by way of pipe 17 and removed from zone 3 by way of pipe 18. Wash solution in pipe 18 contains about 362 pounds of hydrogen iodide and 20,100 pounds of water. This dilute hydriodic acid solution is used to remove iodine from iodine-containing gas in zone 2 and to remove iodine and hydrogen iodide from indine and hydrogen iodide-containing gas in zone 7. The filter cake from zone 3 containing about 3,200 pounds of sulfur, 640 pounds of water, and trace amount of iodine value is removed from zone 3 and fed into zone 4 by way of pipe 12.

In zone 4, sulfur cake is washed with additional wash water. About 20,462 pounds of wash water is fed into zone 4 by way of pipe 15 and removed from zone 4 by way of pipe 16. The resulting wash solution in pipe 16 is then used as wash water for zone 3. The resulting sulfur slurry is then filtered, dried or melted, and recovered as one product. The trace amount of iodine value contained in the sulfur cake in pipe 12 is removed from zone 4 by way of pipe 16.

Concentrated hydriodic acid in pipe 13 is fed into zone 7 as wash solution to remove iodine and hydrogen iodide from iodine and hydrogen iodide-containing gas in zone 7. The resulting concentrated hydriodic acid is removed from zone 7, and later fed into zone 5 by way of pipe 27. Pipe 27 contains about 26,333 pounds of hydrogen iodide, 19,822 pounds of water, and trace amount of iodine. Conventional hydriodic acid dehydration methods can be used. The resulting anhydrous hydrogen iodide is removed from zone 5 by way of pipe 29. Trace amount of iodine contained in pipe 27 is removed from zone 5 and is later recycled to zone 1. Water is removed from zone 5 by way of pipe 28. Water contained in pipe 28 can be used as wash water for zones 2, 3, 4, and 7. Or it is disposed to the air if flue gas is used to dry the dehydration agents.

About 26,333 pounds or 205.73 pound-moles of hydrogen iodide is fed into zone 6 by way of pipe 29. In zone 6, anhydrous hydrogen iodide is liquified and pumped to about 3,000 psia. This hydrogen iodide under high pressure is combined with a recycled stream containing about 68.08 pound-moles of hydrogen iodide and 0.52 pound-moles of iodine. And the resulting stream is heated up to about 400° C. and then passed through the first catalytic bed to decompose hydrogen iodide into hydrogen and iodine. Heat is provided in the catalytic bed for hydrogen iodide decomposition. The resulting stream containing about 167.73 pound-moles of hydrogen iodide, 53.04 pound-moles of hydrogen, and 53.56 pound-moles of iodine is then cooled down to about 184° C. to recover iodine as liquid. After gas-liquid separation, a gaseous stream containing about 167.73 pound-moles of hydrogen iodide, 53.04 pound-moles of hydrogen, and 1.11 pound-moles of iodine; and a liquid stream containing about 52.45 pound-moles or 13,322 pound of iodine are obtained. The iodine-lean gas is then processed through another four stages of operations; each stage of operations consists of heating the iodine-lean gas to between about 320° C. and 380° C. using the hot gas from the catalytic bed of the previous stage, decomposition of the resulting gas at between about 320° C. and 380° C., cooling the resulting product stream to between about 150° C. and 180° C., and gas-liquid separation to obtain iodine-lean gas and to recover iodine as liquid. The final iodine-lean gas contains about 73.81 pound-moles of hydrogen iodide, 100 pound-moles of hydrogen, and 0.52 pound-moles of iodine. This iodine-lean gas is again cooled down to about 40° C. to recover the unreacted hydrogen iodide. After gas-liquid separation, a gaseous stream containing about 5.73 pound-moles of hydrogen iodide, 100 pound-moles of hydrogen, and trace amount of iodine; and a liquid stream containing about 68.08 pound-moles of hydrogen iodide, and 0.52 pound-moles of iodine are obtained. The liquid stream which contains a major portion of the unreacted hydrogen iodide is recycled to the first catalytic bed. The iodine and hydrogen iodide-lean gas containing about 100 pound-moles of hydrogen is removed from zone 6 and fed into zone 7 by way of pipe 31. About 100 pound-moles or 25,400 pounds of iodine recovered in zone 6 is removed from zone 6 by way of pipe 30.

Concentrated hydriodic acid solution from zone 3 containing about 25,693 pounds of hydrogen iodide and 19,822 pounds of water is fed into zone 7 by way of pipe 25 to wash the incoming gas in zone 7. The resulting concentrated hydriodic acid containing about 26,333 pounds of hydrogen iodide and 19,822 pounds of water is removed from zone 7 by way of pipe 26. The resulting gaseous stream is washed with wash water from zone 3. Wash water from zone 3 is fed into zone 7 by way of pipe 19 and removed from zone 7 by way of pipe 20. After these wash, the resulting gaseous stream contains substantially pure hydrogen. This gas can be again washed with fresh water to upgrade product hydrogen purity.

Iodine recovered in zone 6 is then mixed with wash water contained in pipe 20 from zone 7 and in pipe 23 from zone 2 to obtain iodine slurry and/or solution for recycling to zone 1.

The above example shows a new and improved process within this invention for removing hydrogen sulfide and/or mercaptans from hydrogen sulfide and/or mercaptans-containing gases and recovering hydrogen and elemental sulfur from the removed hydrogen sulfide and/or mercaptans. More specifically, the above example shows a process which serves two important functions, namely, air pollution abatement by removing hydrogen sulfide and/or mercaptans from hydrogen sulfide and/or mercaptans-containing gases; and energy conservation by utilizing low level waste heat to manufacture valuable hydrogen which can be used as intermediate chemical for hydrogenation of hydrocarbons, and/or hydrodesulfurization of sulfur-containing materials.

The embodiments of this invention in which an exclusive property or privilege is claimed are defined as follows:

1. A process for recovering hydrogen and elemental sulfur from hydrogen sulfide-containing gas consisting essentially of
   a. removing hydrogen sulfide from hydrogen sulfide-containing gas by passing said hydrogen sulfide-containing gas through aqueous iodine slurry and operating at temperature between about −20° C. and +80° C. and pressure between about 10 psia. and 5000 psia. to obtain a mixture of elemental sulfur and concentrated hydriodic acid in which concentrated hydriodic acid contains more than 40% by weight of hydrogen iodide and less than 60% by weight of water, and to obtain hydrogen sulfide-lean gas which is subsequently washed with dilute hydriodic acid and fresh water to obtain a gaseous stream which is substantially free of sulfide and any entrained iodide;
   b. recovering substantially pure elemental sulfur from said mixture of elemental sulfur and concentrated hydriodic acid by solid-liquid separation to obtain concentrated hydriodic acid filtrate and sulfur cake which is subsequently washed with wash water and is then melted to recover substantially pure elemental sulfur;
   c. flashing said concentrated hydriodic acid filtrate to remove any dissolved hydrogen sulfide for recycling and to obtain sulfide-free solution which is then dehydrated to obtain anhydrous hydrogen iodide;
   d. manufacturing hydrogen from said anhydrous hydrogen iodide by pressurizing anhydrous hydrogen iodide to between about 200 psia. and 5000 psia., heating this pressurized anhydrous hydrogen iodide to a decomposition temperature of about 150° C. to about 600° C., and then passing this pressurized and heated anhydrous hydrogen iodide through a high surface catalyst-containing bed to obtain a gaseous mixture of hydrogen, iodine, and hydrogen iodide; and
   e. recovering substantially pure hydrogen from said gaseous mixture of hydrogen, iodine, and hydrogen iodide by cooling the gaseous mixture of hydrogen, iodine, and hydrogen iodide to above the dew point of hydrogen contained in the gaseous stream to condense and separate substantially pure liquid iodine from the gaseous stream for recycling and then cooling the resulting gaseous stream to below 150° C. to condense and separate liquid hydrogen iodide and trace amount of iodine for recycling and to obtain hydrogen-rich gas which is subsequently washed with concentrated and dilute hydriodic acid, and fresh water to obtain substantially pure hydrogen.

2. The process of claim 1 wherein said hydrogen sulfide-containing gas contains mercaptans.

* * * * *